(No Model.)
W. H. BORDEN.
CHAIN COUPLING FOR STUMP EXTRACTORS.
No. 382,451. Patented May 8, 1888.
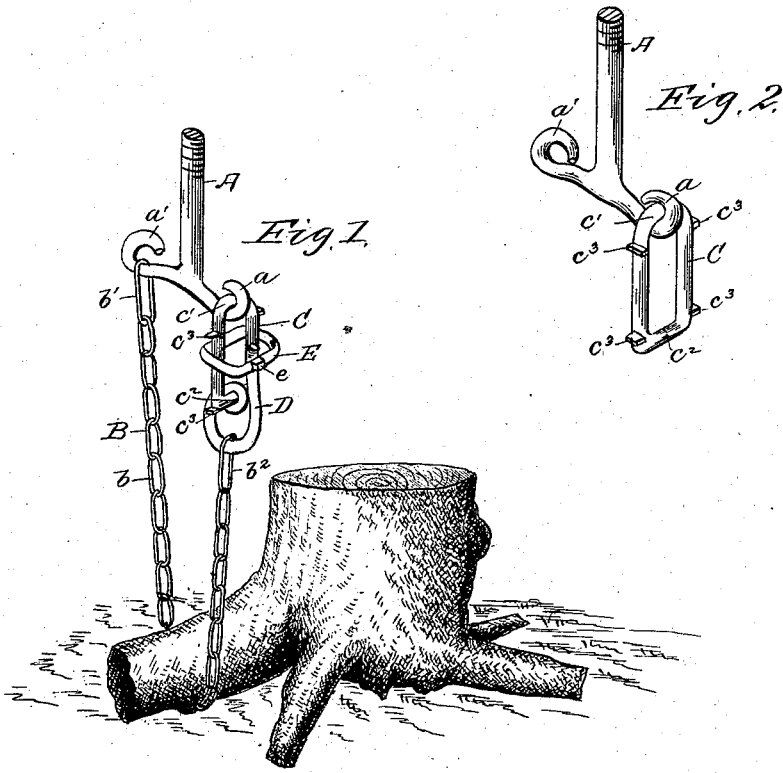
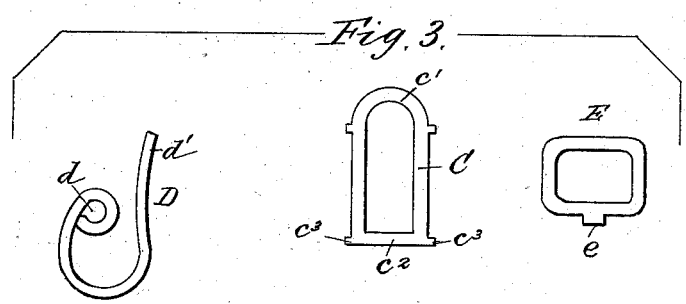
Witnesses:
T. R. Stuart
B. C. Pole
Inventor:
Wilbur H. Borden,
By Marble + Mason,
Attys.
N. PETERS, Photo-Lithographer, Washington, D. C.

UNITED STATES PATENT OFFICE.

WILBUR H. BORDEN, OF SHERIDAN, MICHIGAN.

CHAIN-COUPLING FOR STUMP-EXTRACTORS.

SPECIFICATION forming part of Letters Patent No. 382,451, dated May 8, 1888.

Application filed December 15, 1887. Serial No. 257,926. (No model.)

*To all whom it may concern:*

Be it known that I, WILBUR H. BORDEN, a citizen of the United States, residing at Sheridan, in the county of Montcalm and State of Michigan, have invented certain new and useful Improvements in Chain-Couplings for Stump-Extractors; and I do hereby declare the following to be a full, clear, and exact description of the invention, such as will enable others skilled in the art to which it appertains to make and use the same.

My invention relates generally to that class of stump-extracting machines which are mounted upon vertical or nearly-vertical legs, and in which the power is obtained from screws, and it relates particularly to an improved chain-coupling for such machines, which may also be used for log-chains and similar appliances, wherein one end of the chain is attached to a fixed object and the other end is coupled thereto by a retaining and releasing hook or link.

The object of my invention is to provide a simple, strong, and inexpensive device which may be easily and quickly operated either to secure or release the end of the chain; and the improvement consists in certain novel constructions and combinations of parts, hereinafter particularly described and claimed.

In the accompanying drawings, in which the same letters of reference indicate the same parts, Figure 1 represents a perspective view of my improved chain-coupling applied to the lifting-screw of a stump-extractor, and showing the chain in an operative position as applied to a stump. Fig. 2 represents a modification in perspective of the lifting-screw, showing the catch-link permanently secured thereto; and Fig. 3, detail views of the hook and links forming the coupling.

The lifting-screw A is supported and operated upon the frame of a stump-extractor in any well-known or preferred manner, and is formed at its lower end with oppositely-projecting hooks $a$ $a'$, to which the ends of the chain are attached.

The chain B is of the ordinary form, and is provided with intermediate links, $b$, and the end links, $b'$ $b^2$, the end link $b'$ being secured to the hook $a'$, and the end link $b^2$ being coupled to the hook $a$ of the lifting-screw by my improved coupling. This coupling consists, essentially, of a hook-link, C, a hook, D, and a loose catch-link, E, which are coupled together, and may be either removably attached or permanently secured to the hook $a$ of the lifting-screw. The hook-link C is rounded at its upper end, $c'$, for attachment to the hook $a$, and is straight at its lower end, $c^2$, to receive and provide a smooth cylindrical journal for the hook D. The sides of the hook-link C are straight and parallel with each other, so as to form guides for the loose catch-link E, which encircles said link and moves freely thereon.

The hook D has an eye, $d$, which encircles and turns freely upon the lower end of the hook-link C, and has a projecting hook-shaped finger, $d'$, which is passed through the end link $b^2$ of the chain, and then turned up and caught by the loose catch-link E of the coupling. The loose catch-link E has an outwardly-projecting lug, $e$, opposite that portion of said link against which the finger $d'$ of the hook D is held, and provides means for readily releasing said link from said hook, as will hereinafter appear.

The hook-link C is provided with projecting shoulders $c^3$ at its lower end, and, if preferred, at both its upper and lower ends, to hold the catch-link E in place thereon, so that it will not drop off and be lost or misplaced, and the said hook-link is for like reasons preferably secured permanently to the lifting-screw, as shown in Fig. 2.

The operation of the coupling may be readily understood from the foregoing description; but to be more explicit I will state that it consists in first passing the free end of the chain B under one or more of the roots of a stump, as shown in Fig. 1; then the finger $d'$ of the hook D is passed through any one of the links—as, for instance, the end link $b^2$ of the chain; then the catch-link E is raised upon the hook-link C; then the finger $d'$ of the hook D is turned up to project within said catch-link, and then the said catch-link is let fall to embrace the end of the hook-finger. The end link of the chain B will thus be held securely upon the upper side of the eye $d$ of the hook, and the hook-link and the end links of the chain will be spread at their lower ends by passing around the stump or other object, and be thus held at an angle, as shown in Fig. 1, which will throw the central line of the strain more evenly upon the hook D, and thus relieve the catch-link E of excessive pressure from the finger of the hook. A slight blow upon the end of the projecting lug e upon the catch-link E will serve to raise said catch-link and upset the hook D, thus releasing the end of the chain.

When my improved coupling is used, the chain may be made quite short, and thus can be handled more quickly than when long chains are employed. The coupling is useful whenever the free end of chain is to be attached to a stationary link, but is more especially adapted to suspended chains which admit of a vertically-moving or gravity catch-link.

I claim as my invention—

1. The combination, with the lifting-screw A, of the chain B and hook-link C, each secured to the end thereof, the hook D, having finger $d'$, and a gravity catch-link, E, encircling said hook-link C and sliding longitudinally thereon and engaging with the finger of the hook D, substantially as described.

2. The combination, with the chain B, of the hook-link C, the hook D, and the catch-link E, having an outwardly-projecting lug, e, and fitted to slide upon said hook-link, substantially as described.

3. The combination, with the chain B, of the hook-link C, having outwardly-projecting shoulders $c^3$, the hook D, hinged to the end of said link, and the catch-link encircling said hook-link and adapted to move freely longitudinally and be held thereon by said shoulders, substantially as described.

In testimony whereof I affix my signature in presence of two witnesses.

WILBUR H. BORDEN.

Witnesses:
E. J. SHERWOOD,
H. H. STODDARD.